United States Patent

[11] 3,607,253

| [72] | Inventors | John F. Cain<br>Endicott;<br>Octavio I. Chirino, Endwell, both of, N.Y. |
|---|---|---|
| [21] | Appl. No. | 888,049 |
| [22] | Filed | Dec. 24, 1969 |
| [45] | Patented | Sept. 21, 1971 |
| [73] | Assignee | International Business Machines Corporation<br>Armonk, N.Y. |

[54] TIN BASE SOLDER ALLOY
2 Claims, No Drawings

| [52] | U.S. Cl. | 75/175 A |
|---|---|---|
| [51] | Int. Cl. | C22c 13/00 |
| [50] | Field of Search | 75/175 A |

[56] References Cited
UNITED STATES PATENTS

| 2,303,193 | 11/1942 | Bouton et al. | 75/166 |
|---|---|---|---|

FOREIGN PATENTS

| 249,426 | 6/1947 | Switzerland | 75/175 A |
|---|---|---|---|

*Primary Examiner*—L. Dewayne Rutledge
*Assistant Examiner*—E. L. Weise
*Attorneys*—Hanifin and Jancin and Howard J. Walter

ABSTRACT: A tin base solder alloy containing 1–5 percent by weight bismuth.

This invention pertains to solder alloys useful in electrical applications and in particular to a high creep strength tin base solder containing bismuth.

TIN BASE SOLDER ALLOY

In the electronics industry there are many applications requiring solder alloys having high creep strength, particularly in applications where soldered parts are placed under relatively constant stress for long periods of time. For example, where cantilever spring contacts are to be soldered to a circuit card or other device, the spring force between the contact and its mating surface constantly tries to tear the contact away from its solder joint. The present invention overcomes problems of this type by providing a novel tin base solder alloy having improved creep strength.

It has been indicated in the prior art that creep strength of tine base solder alloys may be increased by the addition of small amounts of silver, usually less than four percent, and of cadmium or antimony, usually less than 1 percent. The present invention improves the state of the art by providing a tin base solder alloy containing significant amounts of bismuth therein.

In summary, invention set out herein is a tin base solder alloy containing 1-5 percent bismuth, 3-3.8 percent silver, 0.7-1.3 percent cadmium and 0.2-0.5 percent antimony.

It is a primary object of the present invention to provide more durable solder joints, particularly those under constant stress.

It is a further object of this invention to prevent cracking in solder joints.

It is yet another object of this invention to improve the mechanical properties of both aged and unaged tin base solders.

The foregoing and other objects, features and advantages of the invention will be apparent from the following more particular description of preferred embodiments of the invention.

In miniature circuit manufacturing procedures it is sometimes necessary to solder spring contacts onto lands present on a module or card in order that the module solder card may be removably mounted in a subframe, electrical contact being made between the contact pads and the spring contacts. The mating pad exert a constant localized force on the spring contacts causing a combination of both compressive and tensile stresses in the solder between the contacts and their corresponding lands. After an extended period of time this tensile stress causes cracks to form in a solder joint between the sprung contacts and the land because of creep failure of the solder alloy. Corrosion or other contamination thereafter forms, which increases the resistance of the circuit thereby lowering the performance of the entire electrical system. If the cracks are allowed to propagate the contacts finally separate from their respective tabs.

In an effort to reduce cracking of solder joints, several approaches were considered in order to increase the stress rupture point and creep strength of the sodler used. The basic approach was to attempt to alter the microstructure of the solder alloy in an effort to provide smaller grain size or strengthening of the metal lattice.

Several methods of physically altering the microstructure were considered which included: quenching the joint and adding additional particulate materials to the solder. Only the last of these methods appear to be feasible. An attempt was made to add small particles, such as tungsten carbide, to the solder melt. This approach proved unworkable as the particles settled out of the solder before it solidified.

Finally, attempts were made to alter the microstructure by changing the composition of the solder itself by adding new alloying metals. Cerium, indium, zinc, and bismuth, among others, were tired and, with the exception of bismuth, each of the metals proved to be no improvement over the original solder alloy.

It was discovered that when bismuth was added to the original solder alloy in amounts from 1 to 5 percent by weight, significant increases in the stress rupture point and creep strength were obtained.

The original alloy, a self-annealing, high creep strength tin-base solder, consisted of 95.11 percent by weight tin, 3.5 percent by weight silver, 1.0 percent by weight cadmium and 0.35 percent weight antimony. The amounts of bismuth added to this composition are believed to be within the solid solubility of the original solder at elevated temperatures. In other words, the bismuth remains in solution in the solder at higher temperatures, but partially precipitates out as a separate phase when the solder cools to room temperature, thereby strengthening the lattice by both atomic interaction and dispersion.

The solder composition found to produce the most desirable results comprises:

89.3-96.0 percent, by weight, tin
1.0-5.0 percent, by weight, bismuth
3.0'-3.8 percent, by weight, silver
0.7-1.3 percent, by weight, cadmium
0.2-0.5 percent, by weight, antimony.

Allowances may be made for inclusion of minority impurities. For best results the maximum amount of the following impurity metals are suggested:

Copper 0.08 percent by weight
Iron 0.02 percent by weight
Zinc 0.005 percent by weight.

The preferred solder alloy of this invention consists of substantially the following composition:

93.2 percent by weight tin
3.4 percent by weight silver
2.0 percent by weight bismuth
1.0 percent by weight cadmium
0.4 percent by weight antimony.

Preparation of the solder alloys herein disclosed may be performed in the following manner. A melt containing the proper portion of tin is prepared and its temperature raised to about 100° C. above the melting point for the silver-tin eutectic composition, i.e., 210° C. The silver is then added, after which the temperature of the melt is controlled at about 300° C. wherein the remaining metals are added. The melt may be then maintained above its melting point, about 210° C. and used as a solder bath, or it may be poured into ingots or formed into any desired shape.

In using the solder alloys of this invention, it is desirable to use an activated or nonactivated flux depending on the condition of the surfaces to be soldered.

While this invention has been particularly shown and described with reference to preferred embodiments thereof, it will be understood by those skilled in the art that the foregoing and other changes in form and details may be made therein without departing from the spirit and scope of the invention.

What is claimed is:

1. A tin base solder alloy comprising from 1.0-5.0 percent by weight bismuth, 3.0-3.8 percent be weight silver, 0.7-1.3 percent by weight cadmium, 0.2-0.5 percent by weight antimony and the balance substantially tin.

2. A tin base solder alloy comprising:
2.0 percent by weight bismuth, 3.4 percent by weight silver, 1.0 percent by weight cadmium, 0.4 percent by weight antimony and the balance substantially tin.